(12) United States Patent
Tanami

(10) Patent No.: US 9,621,082 B2
(45) Date of Patent: Apr. 11, 2017

(54) PRINTING APPARATUS AND MOTOR CONTROL METHOD

(71) Applicant: CANON KABUSHIKI KAISHA, Tokyo (JP)

(72) Inventor: Haruhiko Tanami, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/691,628

(22) Filed: Apr. 21, 2015

(65) Prior Publication Data

US 2015/0314619 A1 Nov. 5, 2015

(30) Foreign Application Priority Data

May 2, 2014 (JP) ................................. 2014-095508

(51) Int. Cl.
*B41J 19/20* (2006.01)
*H02P 6/10* (2006.01)
*B41J 25/00* (2006.01)

(52) U.S. Cl.
CPC .............. *H02P 6/10* (2013.01); *B41J 19/202* (2013.01); *B41J 19/207* (2013.01); *B41J 25/006* (2013.01); *B41J 19/205* (2013.01)

(58) Field of Classification Search
CPC ......... B41J 19/202; B41J 19/205; H02P 6/04; H02P 6/08; H02P 6/10
USPC .................................................. 347/5, 19, 39
See application file for complete search history.

(56) References Cited

U.S. PATENT DOCUMENTS

| 6,055,391 | A | * | 4/2000 | Jackson ............... G01B 11/272 356/614 |
| 6,921,147 | B2 | | 7/2005 | Mitarai et al. |
| 8,474,945 | B2 | * | 7/2013 | Murray ........................... 347/19 |
| 8,646,874 | B2 | * | 2/2014 | Price ................................ 347/37 |
| 2003/0117448 | A1 | * | 6/2003 | Kokubo et al. .................... 347/5 |
| 2005/0046413 | A1 | * | 3/2005 | Schmidt et al. ............... 327/164 |
| 2006/0127156 | A1 | * | 6/2006 | Takahashi ................ B41J 19/04 400/303 |

(Continued)

FOREIGN PATENT DOCUMENTS

| JP | 2005161712 A | * | 6/2005 |
| JP | 2006256226 A | * | 9/2006 |
| JP | 2011-230365 A | | 11/2011 |

*Primary Examiner* — Julian Huffman
*Assistant Examiner* — Sharon A Polk
(74) *Attorney, Agent, or Firm* — Fitzpatrick, Cella, Harper & Scinto

(57) ABSTRACT

An embodiment of this invention is directed to implementing motor control of suppressing the influence of the cogging of a motor while minimizing preliminary detection processing. According to this embodiment, a printing apparatus includes an acceleration sensor for detecting the acceleration of a moving carriage, and a control unit configured to control drive of the motor to suppress the influence of the cogging of the motor based on the detection by the acceleration sensor. In accordance with the relationship between the band of the cogging frequency of the motor and the band of the resonance frequency of the carriage, the control unit determines whether to use a cancel signal for feedback control of an encoder sensor. When the cancel signal is not used, the control unit changes the gain of feedback control of the acceleration sensor.

13 Claims, 7 Drawing Sheets

(56) References Cited

U.S. PATENT DOCUMENTS

| | | | |
|---|---|---|---|
| 2012/0001576 A1* | 1/2012 | Iwadate | B41J 19/202 318/400.23 |
| 2013/0194336 A1* | 8/2013 | Iwadate | B41J 19/202 347/14 |
| 2013/0257953 A1* | 10/2013 | Iesaki | 347/14 |
| 2013/0307902 A1* | 11/2013 | Kato | B41J 23/14 347/37 |

* cited by examiner

F I G. 10
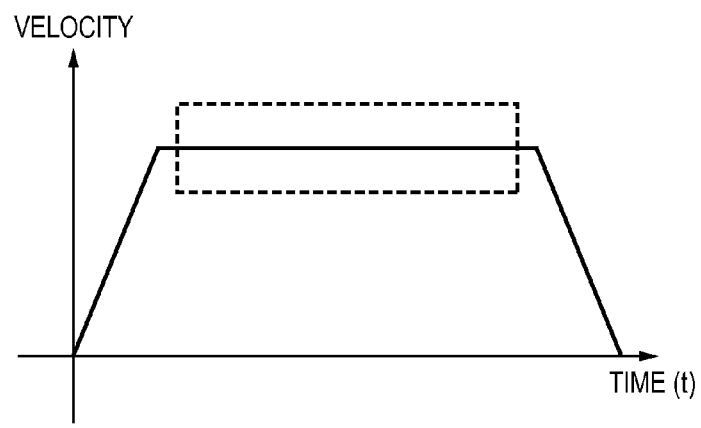
F I G. 11A
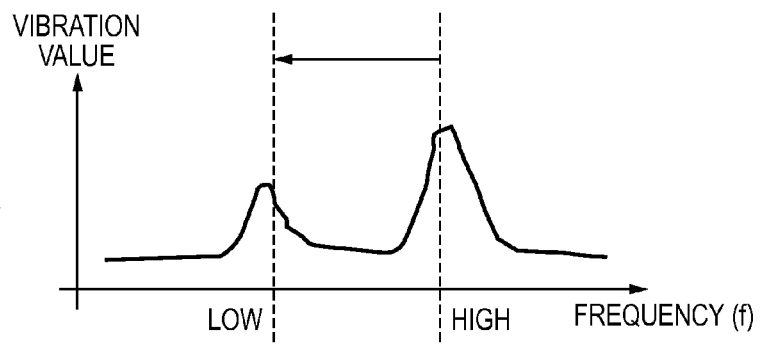
F I G. 11B
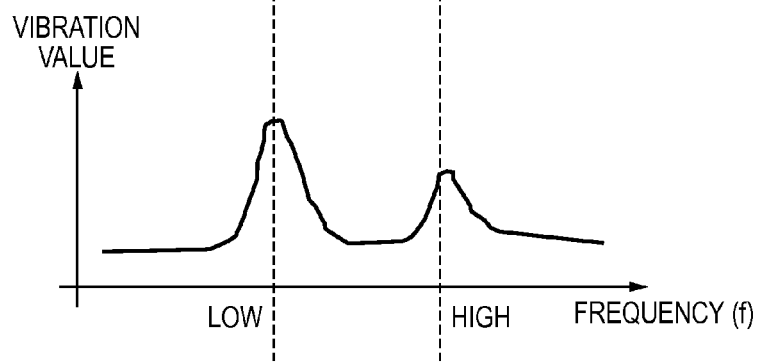

PRINTING APPARATUS AND MOTOR CONTROL METHOD

BACKGROUND OF THE INVENTION

Field of the Invention

The present invention relates to a drive control technique for a moving object such as the carriage of a serial printing apparatus.

Description of the Related Art

In a serial printer, motor drive of a carriage that is reciprocally moved by a motor is generally feedback control such as PID control using an encoder. At this time, there is known control of resolving the influence of the variation of the torque of a DC motor.

In motor drive control disclosed in Japanese Patent Laid-Open No. 2011-230365, a signal generator generates a signal having periodicity, and the periodical parameter of the cogging torque is extracted in advance prior to a print operation. A periodical vibration is detected from the obtained velocity variation amount of the carriage. A voltage correction value (cancel signal) to be applied in a direction in which the periodical vibration caused by the cogging torque is canceled is calculated to perform drive control of the carriage at the time of printing.

In this specification, feedforward control of canceling a cogging torque by predictively adding a vibration suppression value based on preliminary information will be called "cogging cancel control" hereinafter.

The cogging cancel control disclosed in Japanese Patent Laid-Open No. 2011-230365 requires a step of detecting a cogging torque in advance prior to carriage drive for printing in order to generate a cancel signal. This detection takes a long time, is an overhead other than a real print operation, and hinders the improvement of the total print throughput. How to reduce this overhead is a problem to be solved.

SUMMARY OF THE INVENTION

Accordingly, the present invention is conceived as a response to the above-described disadvantages of the conventional art.

For example, a printing apparatus and motor control method according to this invention are capable of implementing new motor control using an acceleration sensor.

According to one aspect of the present invention, there is provided a printing apparatus that performs printing while moving a carriage by a motor, comprising: an acceleration sensor, provided in the carriage, for detecting an acceleration of the moving carriage; and a control unit configured to control drive of the motor to suppress influence of cogging of the motor based on the detection by the acceleration sensor.

According to another aspect of the present invention, there is provided a printing apparatus that performs printing while moving a carriage by a motor, comprising: an acceleration sensor, provided in the carriage, for detecting an acceleration of the moving carriage; and a control unit configured to control drive of the motor by feedback control based on information detected by the acceleration sensor, wherein the control unit can change a gain of the feedback control.

According to still another aspect of the present invention, there is provided a method of controlling a motor used to move an object, comprising: detecting an acceleration of the moving object by an acceleration sensor provided in the object; and controlling drive of the motor to suppress influence of cogging of the motor based on the detection by the acceleration sensor.

According to still another aspect of the present invention, there is provided a method of controlling a motor used to move an object, comprising: detecting at least one of a position and velocity of the object by an encoder sensor; detecting an acceleration of the moving object by an acceleration sensor provided in the object; and controlling drive of the motor based on the detection by the encoder sensor and the acceleration sensor.

The invention is particularly advantageous since the influence of the cogging can be suppressed more simply than the conventional art by providing an acceleration sensor in an object such as a moving carriage, and performing motor control using detected acceleration information.

Further features of the present invention will become apparent from the following description of exemplary embodiments (with reference to the attached drawings).

BRIEF DESCRIPTION OF THE DRAWINGS

FIG. 10 is a graph showing an example of a temporal change of the carriage velocity.

FIGS. 11A and 11B are graphs each showing the result of obtaining frequency component data by performing fast Fourier transform (FFT) processing on a detection value from an acceleration sensor at a portion surrounded by the dotted line in FIG. 10.

DESCRIPTION OF THE EMBODIMENTS

Exemplary embodiments of the present invention will now be described in detail in accordance with the accompanying drawings. In the following description, drive control of a motor that moves the carriage of a serial printer will be exemplified. However, motor control according to the present invention is not limited to the carriage of the printer and is applicable as long as an object is moved by motor drive.

An arrangement regarding the implementation of motor control of suppressing the influence of the cogging of a motor while minimizing preliminary detection processing will be clarified throughout the description of the following embodiment.

<Description of Printing Apparatus (FIG. 1)>

Figure 1:
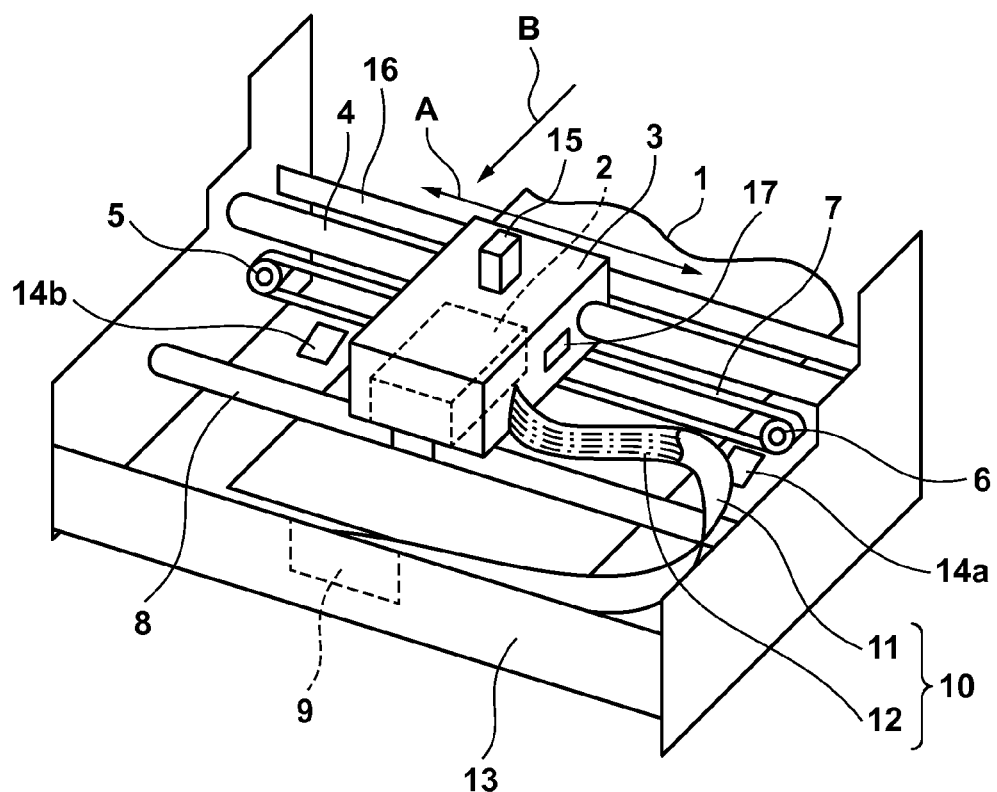
FIG. 1 is a perspective view showing the main mechanical part of an inkjet printing apparatus as an exemplary embodiment of the present invention.

FIG. 1 is a perspective view showing the outer appearance of the arrangement of a printing apparatus in which an inkjet printhead (to be referred to as a printhead hereinafter) configured to discharge an ink droplet according to an inkjet method is mounted, as an exemplary embodiment of the present invention.

A carriage (moving object) 3 in which a printhead 2 is mounted is slidably supported by a guide shaft 4, and reciprocally moves above a print medium (sheet) 1. A carriage motor (DC motor) 5 with a pulley is arranged at one end of the moving range of the carriage 3, and an idle pulley 6 is arranged at the other end. A timing belt 7 is looped around the carriage motor 5 and the idle pulley 6, and connected to the carriage 3.

To prevent rotation of the carriage 3 about the guide shaft 4, a support member 8 is arranged to extend parallel to the guide shaft 4. The support member 8 also slidably supports the carriage 3. The printhead 2 includes many print elements, and an FFC (Flexible Flat Cable) 11 is arranged to supply a print element drive signal from the main body of the printing apparatus to the printhead 2. The FFC 11 has a long, thin film shape, and a conductive pattern for transferring a drive signal is formed inside or on the FFC 11. The FFC 11 has flexibility so that it bends along with movement of the carriage 3 and the center position of the bend moves.

An ink tank (not shown) is arranged outside the carriage 3, and a tube 12 is arranged to supply, to the printhead 2, ink stored in the ink tank. The tube 12 has flexibility so that it bends along with movement of the carriage 3 and the center position of the bend moves. A connection member 10 formed from the FFC 11 and the tube 12 is connected between the carriage 3 and a fix portion 9 of the main body 13 of the printing apparatus.

A linear scale 16 used to obtain position information of the carriage 3 is arranged parallel in the carriage moving direction (main scanning direction), and read by an encoder sensor 15 attached to the carriage 3. Further, ink recovery ports 14a and 14b for collecting preliminarily discharged ink of the printhead 2 are provided on the two outer sides of the print medium 1 in the widthwise direction. The preliminary discharge is an operation for discharging ink attached to the distal end of a nozzle, at a position irrelevant to printing immediately before the start of printing or during execution of printing.

With this arrangement, the carriage 3 reciprocally moves in directions (main scanning direction) indicated by an arrow A. A conveyance motor (not shown) conveys the print medium 1 in a direction (sub-scanning direction) indicated by an arrow B that perpendicularly crosses the carriage 3. An acceleration sensor 17 mounted in the carriage 3 mainly detects vibration information of the carriage 3 in the main scanning direction.

Figure 2:
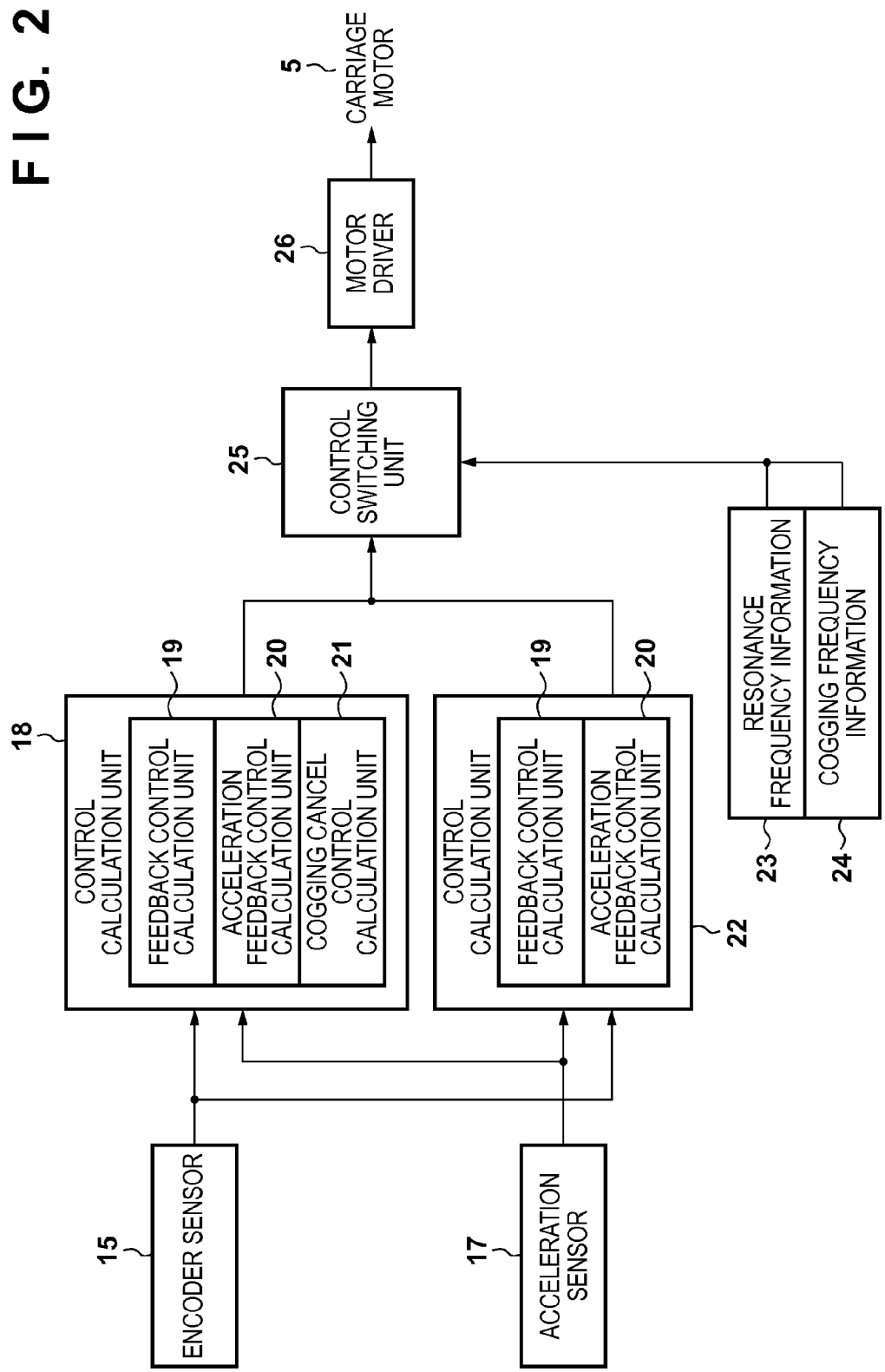
FIG. 2 is a block diagram showing the control unit of the printing apparatus shown in FIG. 1.

FIG. 2 is a block diagram showing the arrangement of the control unit of the printing apparatus shown in FIG. 1. In particular, FIG. 2 shows the control unit of carriage scanning.

A control calculation unit 18 executes control calculation using a feedback control calculation unit 19, an acceleration feedback control calculation unit 20, and a cogging cancel control calculation unit 21. A control calculation unit 22 executes control calculation using the feedback control calculation unit 19 and the acceleration feedback control calculation unit 20. Both the control calculation units 18 and 22 receive information about a position, velocity, and acceleration detected by the encoder sensor 15 and the acceleration sensor 17, and execute respective control calculations.

In the above-described control units, the feedback control calculation unit 19 performs position/velocity control of a drive target (carriage), and the acceleration feedback control calculation unit 20 performs vibration suppression of the carriage 3. The cogging cancel control calculation unit 21 is a circuit for performing suppression of a vibration caused by the cogging of the carriage motor 5 (cogging ripple of the DC motor).

A control switching unit (determination unit) 25 receives resonance frequency information 23 and cogging frequency information 24 of the drive target (carriage), and determines and selects either of the control calculation units 18 and 22 for an operation amount to be output to a motor driver 26. As the switching condition, the result of comparison between the resonance frequency information 23 and the cogging frequency information 24 is used. The resonance frequency band of the drive target (carriage) is identified based on the resonance frequency information 23, and the size relationship between this band and a cogging frequency band based on the cogging frequency information 24 is discriminated. If a cogging frequency band fcz exists in a frequency band equal to or higher than a resonance frequency band frz (fcz≥frz), the control switching unit 25 determines to use the control calculation unit 18, and selects it. In contrast, if the cogging frequency band fcz exists in a frequency band lower than the resonance frequency band frz (fcz<frz), the control switching unit 25 determines to use the control calculation unit 22, and selects it.

The cogging frequency band fcz and the resonance frequency band frz change over time depending on the use conditions of the drive target (carriage in this case). Vibration suppression can be appropriately implemented by determining, in accordance with the change, which of the two control calculation units is used.

Figure 3:
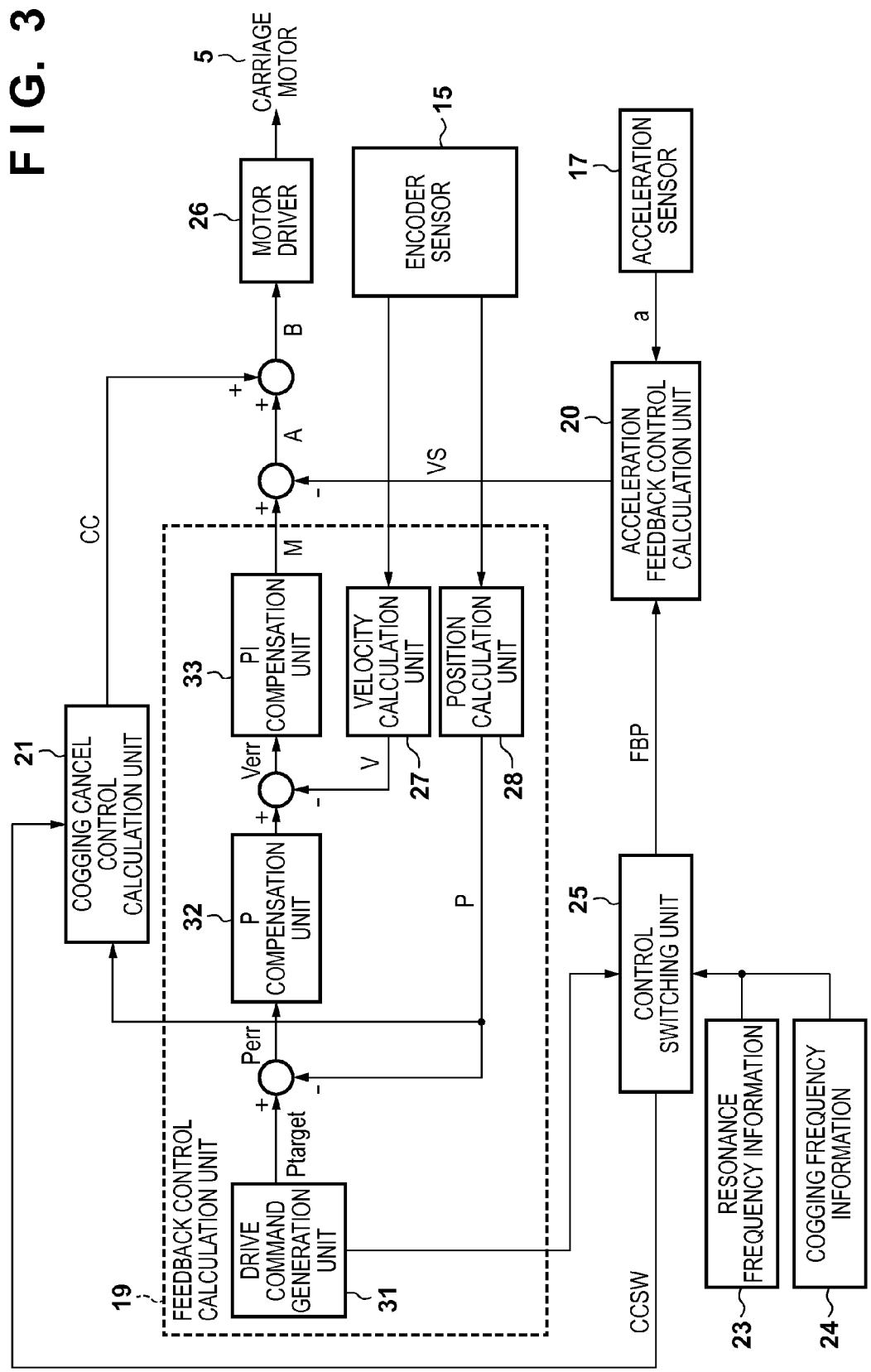
FIG. 3 is a block diagram showing a control unit for a carriage drive mechanism.

FIG. 3 is a block diagram showing a detailed control unit for the carriage drive mechanism. Particularly, FIG. 3 shows the detailed arrangement of the feedback control calculation unit 19.

First, a drive command generation unit 31 generates a position target Ptarget corresponding to the drive time in accordance with the movement target of the drive target (carriage). A position error Perr is calculated by performing subtraction between the position target, and position information P obtained by converting the reading result of the encoder sensor 15 by a position calculation unit 28. In the example of FIG. 3, a velocity target Vtarget is calculated by executing P control on the position error by a P compensation unit 32. A velocity error Verr is calculated by performing subtraction between the velocity target, and velocity information V obtained by converting the reading result of the encoder sensor 15 by a velocity calculation unit 27. In FIG. 3, a motor setting value M in the acceleration dimension is calculated by performing PI control on the velocity error Verr by a PI compensation unit 33. By repeating this feedback control in every specific period, the carriage 3 is moved to a predetermined target position.

Next, acceleration feedback control to be executed by the acceleration feedback control calculation unit 20 will be explained.

The acceleration sensor 17 mounted in the carriage 3 outputs acceleration information a, and the acceleration feedback control calculation unit 20 calculates a vibration suppression value VS based on the acceleration information a. The vibration suppression value VS is a physical value of the acceleration dimension. An operation amount A is calculated by subtracting the vibration suppression value VS from the motor setting value M. The acceleration feedback control calculation unit 20 performs feedback calculation in order to suppress the vibration. The feedback control gain or the like is designated by an acceleration FB control parameter value FBP serving as an output result from the control switching unit 25.

If the acceleration information a is input to the acceleration feedback control calculation unit 20, control calculation can be performed. Theoretically, the acceleration information a can also be converted into a value of physically the same dimension by performing a differential operation on the detection result of the encoder sensor 15. However, if the differential operation is performed, the noise component is amplified, and it is hard to say that a correct value can be detected. Even if smoothing processing or the like is performed to remove the noise component, a phase delay by the smoothing processing is generated. In this manner, in feedback control using the acceleration information a, the closed loop characteristic of feedback control is lost, and it is difficult in practice to achieve good control performance. Therefore, the detection result of the acceleration sensor 17 that is permanently provided in the carriage 3 and can directly detect the moving acceleration of the carriage is used as the acceleration information a to the acceleration feedback control calculation unit 20.

Finally, the cogging cancel control calculation unit 21 will be explained. The cogging cancel control calculation unit 21 generates a cogging cancel signal CC having a periodically varying signal value in accordance with the position information P of the carriage 3, in order to cancel the cogging. The cogging cancel signal CC is converted into a value of the same dimension as that of a motor command value, and is added to the operation amount A to calculate an operation amount B. The operation amount B serves as a final motor drive command, and is input to the motor driver 26 to drive the carriage motor 5 by the motor driver 26.

Figure 4A:
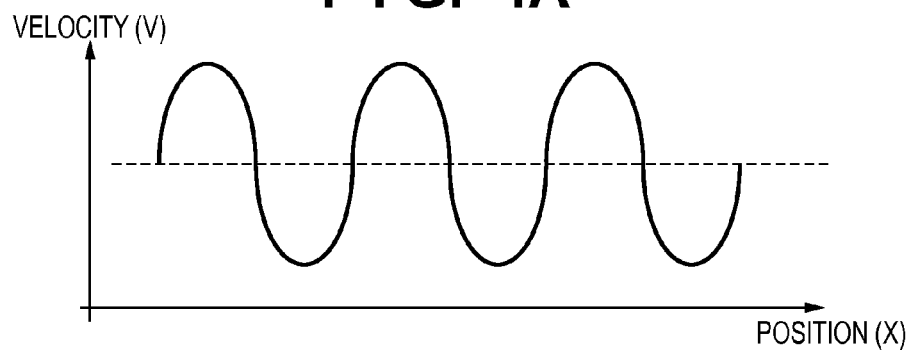
FIGS. 4A and 4B are graphs showing the relationship between the carriage velocity and the cogging cancel signal.
Figure 4B:
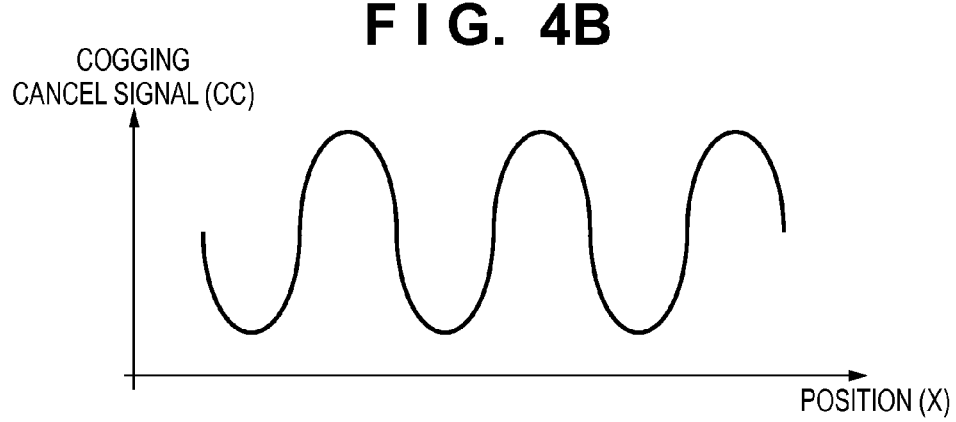

FIGS. 4A and 4B are graphs showing the relationship between the carriage velocity and the cogging cancel signal. FIG. 4A is a graph showing the velocity variation with respect to a carriage position x. FIG. 4B is a graph showing the cogging cancel signal CC with respect to the same carriage position x.

The solid line in FIG. 4A indicates the velocity variation of the carriage having a periodical vibration caused by the cogging torque in a state in which no cogging cancel signal is added. The cogging cancel signal is a signal that gives an output opposite in phase to the periodical component of the velocity variation. The solid line in FIG. 4B indicates this cogging cancel signal. By adding the cogging cancel signal, the carriage velocity indicated by the solid line in FIG. 4A becomes a velocity indicated by the dotted line, and the variation factor of the cogging torque can be canceled. To perform cogging cancel control calculation, it is necessary to calculate vibration information of the cogging corresponding to position information of the carriage from preliminary carriage position detection prior to a print operation, and obtain a correction value. However, this processing is also described in the above-described conventional art, and a detailed description thereof will be omitted here.

The preliminary detection operation for obtaining this cancel signal is accompanied by carriage movement different from that for original image printing. As the time taken for this operation becomes longer, the total print throughput becomes lower. Therefore, a problem to be solved in this embodiment is to decrease the number of preliminary operations for obtaining a cancel signal, compared to the conventional art.

Based on the result of cogging cancel control CCSW serving as the output value of the control switching unit 25, the cogging cancel control calculation unit 21 determines whether to execute the calculation processing. When the calculation processing is not to be executed, "0" is output as the cogging cancel signal CC.

The control switching unit 25 determines the acceleration FB control parameter value FBP and the cogging cancel control CCSW. The conditional determination in the control switching unit 25 uses the resonance frequency information 23 and cogging frequency information 24 of the carriage mechanism serving as a drive target, a drive velocity condition discriminable from a drive command generation unit 31, and the like.

Figure 5A:
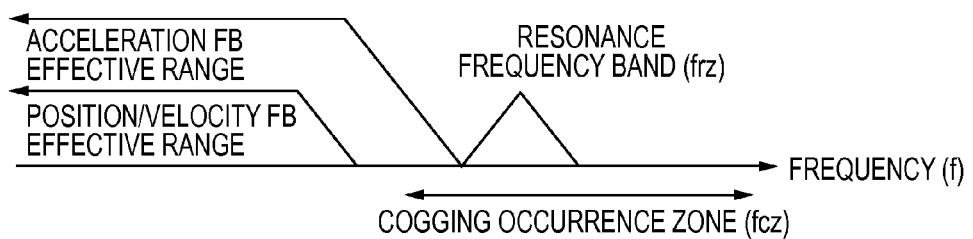
FIGS. 5A and 5B are views showing the relationship between the cogging occurrence zone and the resonance frequency band in high-velocity drive and low-velocity drive of a carriage.
Figure 5B:
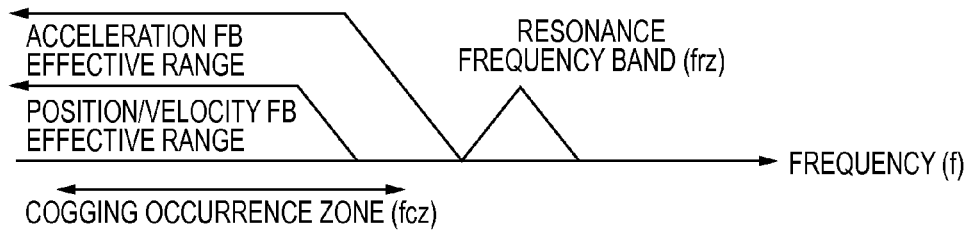

FIGS. 5A and 5B are views showing the relationship between the resonance frequency information and the cogging frequency information. In FIGS. 5A and 5B, the abscissa indicates the frequency f, and represents the relationship between the cogging occurrence zone and the resonance frequency band of the carriage mechanism.

The cogging occurrence zone shown in FIGS. 5A and 5B is equivalent to the cogging frequency information 24. In general, the cogging vibration caused by the motor is generated depending on the switching timing for the number of throttles of the DC motor or the like, and has a plurality of vibration frequencies. For example, in a two-pole, five-slot DC motor, the vibration occurs two times, five times, and 10 times for one rotation of the motor. For this reason, the cogging occurrence zone fcz is information having a specific width on the frequency axis, and the cogging frequency information 24 includes all this information.

Similar to the cogging frequency information 24, the resonance frequency information 23 is information having a specific width on the frequency axis, and is represented as the resonance frequency band frz in FIGS. 5A and 5B. FIG. 5A shows a case in which fcz≥frz, and FIG. 5B shows a case in which fcz<frz.

Figure 6:
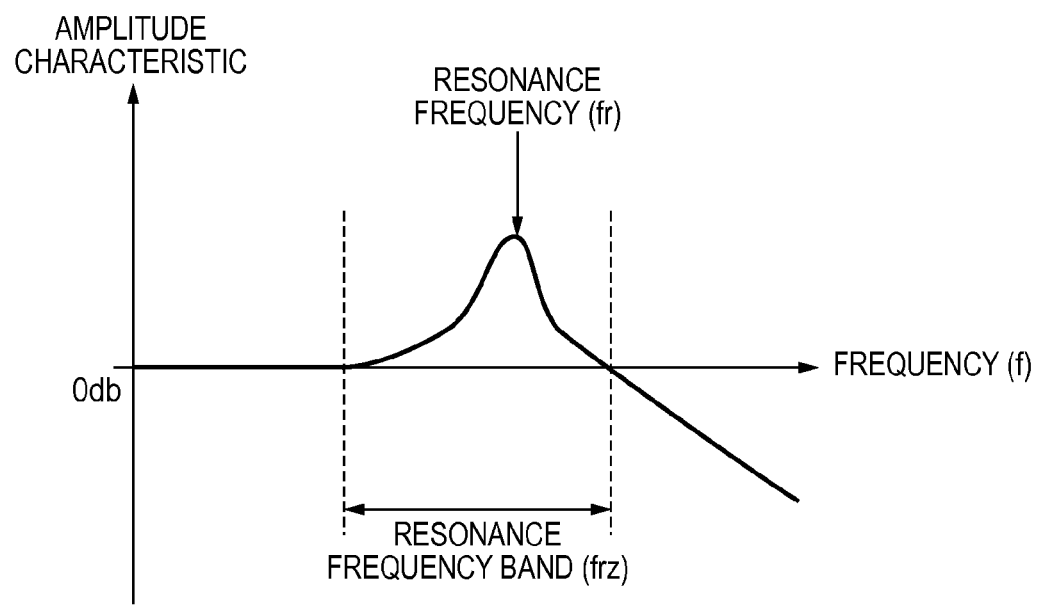
FIG. 6 is a graph showing the amplitude characteristic of a velocity closed loop representing a response to an actual velocity from the velocity target obtained from a feedback control calculation unit that performs position/velocity control.

FIG. 6 is a graph showing the amplitude characteristic of a velocity closed loop representing a response to an actual velocity from the velocity target Vtarget of the feedback control calculation unit that performs position/velocity control. A resonance frequency fr serving as the peak of the amplitude characteristic shown in FIG. 6 is equivalent to the resonance point of the carriage drive mechanism serving as the drive target.

The closed loop characteristic of the feedback control calculation unit 19 for the drive mechanism having the amplitude characteristic as shown in FIG. 6 will be examined. As shown in FIG. 6, the amplitude characteristic becomes "0" db in a frequency zone much lower than the resonance frequency fr. This means that the closed loop has a characteristic capable of tracing the velocity target without an error. To the contrary, the amplitude characteristic exhibits a positive value larger than "0" db at the resonance frequency fr. This indicates that the closed loop has a characteristic in which an error readily occurs in the vibration direction with respect to an input signal. This is generally called a resonance phenomenon.

The resonance phenomenon has a hilly characteristic that peaks at the resonance frequency fr, and the resonance gradually decreases as the frequency moves apart from the resonance frequency fr. The resonance frequency information 23 includes the entire frequency band in which the amplitude characteristic is distributed in the hilly shape with reference to the resonance frequency fr. This zone information is illustrated as the resonance frequency band frz. A frequency zone higher than the resonance frequency band frz is a zone in which feedback control cannot trace the drive target, and the characteristic exhibits a value smaller than "0" db.

The comparison between the cogging occurrence zone (obtained from the cogging frequency information 24) and the resonance frequency band (obtained from the resonance frequency information 23), which will be described later, is the comparison between frequency bands having a specific width. In this case, considering highest-safety discrimination for the resonance phenomenon, it is desirable to compare a maximum frequency fczmax of the cogging occurrence zone and a minimum frequency frzmin of the resonance frequency band. However, for example, there is a case where a vibration at the maximum frequency exists as the cogging characteristic of the motor, but it may be at a negligible level. In this case, the comparison may be performed based on a cogging frequency serving as a second highest frequency. Also, at the resonance frequency fr of the resonance frequency band frz, the vibration is a problem, but this vibration characteristic may be negligible at the periphery of the hilly characteristic. In this case, part of the hilly characteristic up to a predetermined zone may not be used as the comparison target.

Referring back to FIGS. 5A and 5B, the explanation will be continued. The cogging of the motor has a characteristic in which the cogging frequency shifts depending on the moving velocity of the carriage, that is, the motor rotational velocity. More specifically, the cogging frequency appears in a relatively higher zone when the carriage velocity is high, and appears in a relatively lower zone when the carriage velocity is low. In contrast, the resonance frequency band does not depend on the carriage velocity. FIG. 5A shows a characteristic when the carriage velocity is relatively high. FIG. 5B shows a characteristic when the carriage velocity is relatively low. In this embodiment, the cogging occurrence zone is determined in accordance with a drive velocity condition discriminable from the drive command generation unit 31. By comparing the cogging occurrence zone and the resonance frequency band, one of the conditions in FIGS. 5A and 5B is identified as a condition at the time of carriage drive.

FIGS. 5A and 5B show the effective range of position/velocity feedback control and the effective range of acceleration feedback control. The effective range of acceleration feedback can cope with up to a zone in which the frequency band is higher than the effective range of position/velocity feedback. This is because position information used in control generates a phase delay of 180° in principle due to the fact that the transfer characteristic from a thrust force applied to a control target to position information is expressed by double integration. Since there is no phase delay in acceleration information, the controllable frequency band becomes wide.

Figure 7:
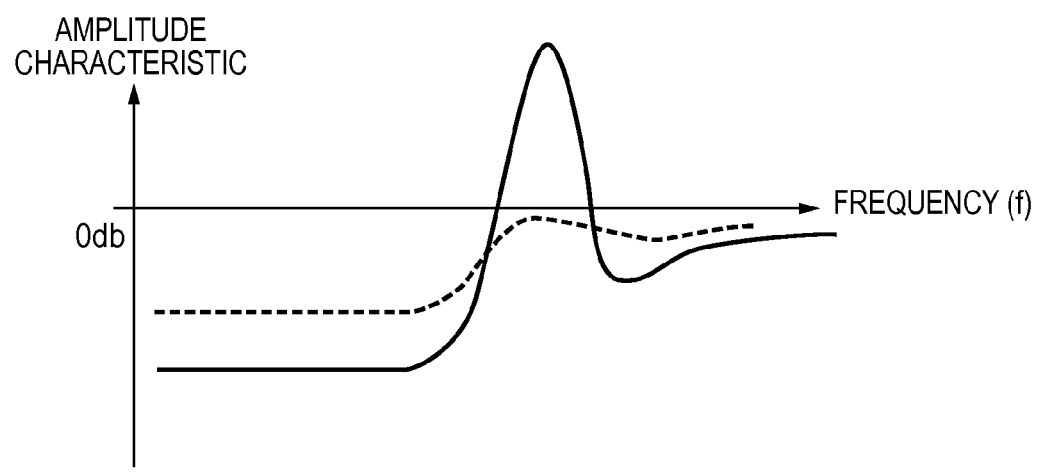
FIG. 7 is a graph showing the external disturbance suppression characteristic of the control loop by acceleration feedback.

FIG. 7 is a graph showing the external disturbance suppression characteristic of the control loop by acceleration feedback. As shown in FIG. 7, as a general trend, the input vibration is satisfactorily suppressed by the feedback effect up to the vicinity of a frequency band serving as the phase limit. At the vicinity of the phase limit, a slightly resonant characteristic is exhibited. In a frequency zone higher than the phase limit, the vibration suppression effect is hardly expected.

In FIG. 7, the solid line represents a characteristic when the control gain is high, and the dotted line represents a characteristic when the control gain is low. When the control gain is high, a satisfactory vibration suppression characteristic is exhibited in a band lower than the phase limit, as indicated by the solid line. At the phase limit, the vibration amount by resonance also increases, increasing the external disturbance. To the contrary, when the control gain is low, the external disturbance is not amplified even at the phase limit, as indicated by the dotted line, but the vibration suppression effect at the phase limit or lower also decrease. In this case, the vibration suppression effect in the band lower than the phase limit decreases in comparison with the solid line.

A final vibration suppression effect is determined by superposing the external disturbance suppression characteristic shown in FIG. 7 and the resonance frequency bands shown in FIGS. 5A and 5B. A satisfactory vibration suppression effect is mainly obtained in a zone equal to or lower than the resonance band frz.

On the condition (fcz≥frz) shown in FIG. 5A, the cogging cancel control CCSW is validated, and control using the cogging cancel signal CC is performed. In this case, control calculation is executed from the feedback control calculation unit 19, the acceleration feedback control calculation unit 20, and the cogging cancel control calculation unit 21. This control calculation arrangement is the control calculation unit 18. In the control calculation unit 18, the cogging cancel control calculation unit 21 is responsible for a vibration caused by the cogging. Since the resonance characteristic of the acceleration feedback control calculation unit 20 may excite the cogging vibration, a low control gain is employed in acceleration feedback, and a characteristic as indicated by the dotted line shown in FIG. 7 is used. Although the vibration suppression effect in a band lower than the resonance band decreases, the vibration by the feedback control calculation unit 19 is relaxed to a certain degree thanks to the suppression effect.

To the contrary, on the condition (fcz<frz) shown in FIG. 5B, the cogging cancel control CCSW is invalidated, and control is performed without using the cogging cancel signal CC. In this case, control calculation is executed from the feedback control calculation unit 19 and the acceleration feedback control calculation unit 20. This control calculation arrangement is the control calculation unit 22. In the control calculation unit 22, the acceleration feedback control calculation unit 20 is responsible for a vibration caused by the cogging. In this case, since the cogging vibration frequency fcz exists at a frequency equal to or lower than the resonance frequency fr, it is predicted that there is no input external disturbance. Hence, even if the resonance characteristic of the acceleration feedback control calculation unit 20 slightly vibrates, it is quite unlikely to generate a large adverse effect. Thus, a high control gain is employed in acceleration feedback, and a characteristic as indicated by the solid line shown in FIG. 7 is used, maximizing the suppression effect of the cogging vibration by acceleration feedback. The result of the control gain setting in the control calculation unit 18 or 22 is equivalent to the acceleration FB parameter value FBP.

In this way, it can be determined which of the control calculation units 18 and 22 is used. In addition, the control gain of acceleration feedback can be changed.

Figure 8A:
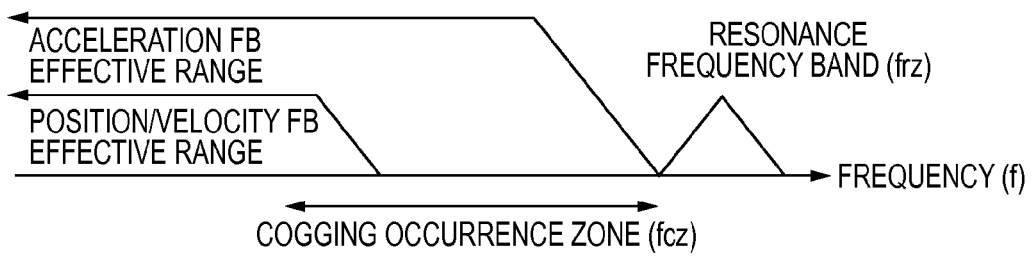
FIGS. 8A and 8B are views respectively showing the relationship with the cogging occurrence zone in a case where the resonance frequency exists in a high frequency zone and in a case where the resonance frequency exists in a low frequency zone.
Figure 8B:
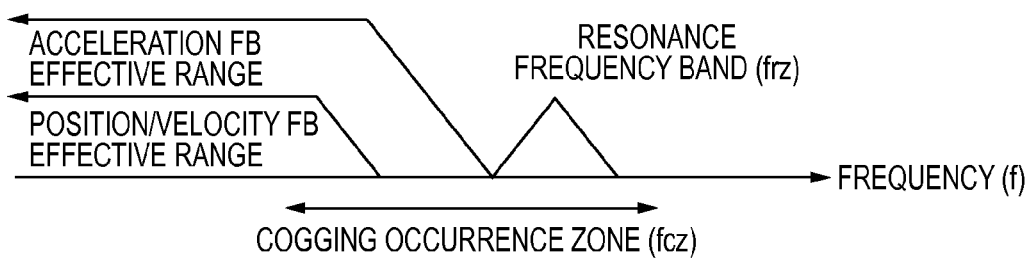

FIGS. 8A and 8B are views showing the frequency characteristics of the effective range of position/velocity feedback control and the effective range of acceleration feedback control in a case where the cogging occurrence zone does not change and the resonance frequency band changes. FIG. 8B shows a relationship in which the resonance frequency band shifts to a lower zone in comparison with FIG. 8A. This phenomenon appears in a situation in which the sliding friction or the like increases along with aging of the carriage 3, a mechanical change appears, the control target becomes heavy, and the resonance frequency band decreases.

Figure 9:
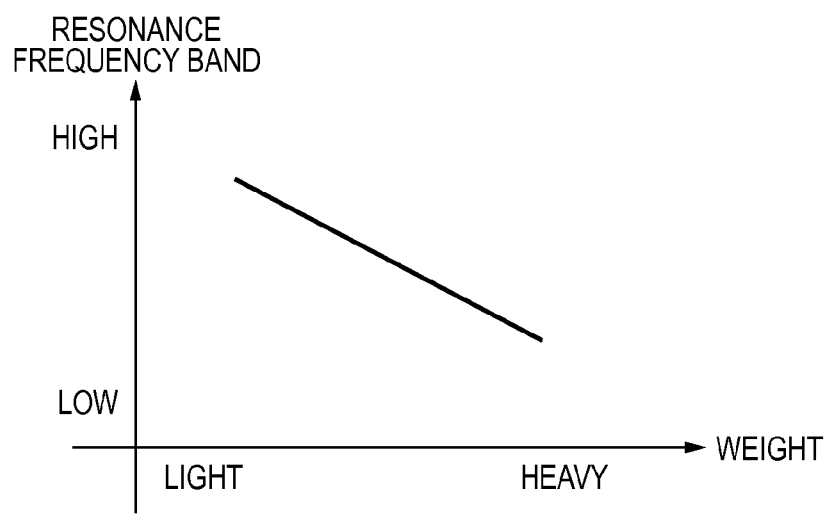
FIG. 9 is a graph showing the relationship between the weight of a control target and the resonance frequency band.

FIG. 9 is a graph showing the relationship between the weight of the control target and the resonance frequency band. As shown in FIG. 9, the resonance frequency generally shifts to a low zone as the weight of the control target increases.

The example shown in FIG. 8A represents a case in which the cogging occurrence zone fcz exists in a frequency zone lower than the resonance frequency band frz. In this case, the control calculation unit 22 performs vibration suppression. However, since the resonance frequency band shifts to a low zone along with aging of the carriage 3, the cogging occurrence zone overlaps the resonance frequency band, as shown in FIG. 8B, and a vibration caused by the cogging increases. In this case, satisfactory vibration suppression can be performed by switching the control to the control calculation unit 18.

Various methods are conceivable for acquiring the resonance frequency information 23 of the carriage mechanism that is necessary for this switching determination. This embodiment uses the vibration value of the acceleration sensor 17, discriminates the vibration characteristic from frequency analysis or the like, and identifies the resonance frequency band.

A resonance frequency band identification method using the acceleration sensor 17 will be explained with reference to FIGS. 10, 11A, and 11B.

FIG. 10 is a graph showing an example of a temporal change of the carriage velocity. In this embodiment, a detection value from the acceleration sensor 17 is extracted during carriage drive at a constant velocity zone portion surrounded by the dotted line shown in FIG. 10, and frequency analysis is performed.

FIGS. 11A and 11B are graphs each showing the result of obtaining frequency component data by performing fast Fourier transform (FFT) processing on a detection value from the acceleration sensor 17 at the portion surrounded by the dotted line in FIG. 10.

FIG. 11A shows a state in which the vibration peak is positioned in a high frequency zone when the control target is light. FIG. 11B shows a state in which the vibration peak moves toward a low frequency zone when the control target is heavy.

To identify the resonance frequency band in this fashion, it is conceivable to, for example, watch a resonance frequency value exhibiting a vibration peak, as needed, or watch the entire resonance frequency band that spreads from the resonance frequency serving as the center. In addition, the resonance frequency depends on the arrangement of the carriage mechanical part, and does not change depending on the carriage velocity. Upon pursuing a higher accuracy, a change of the resonance frequency band may be watched from the analysis of the frequency analysis results of a plurality of carriage velocities. In addition to the above-mentioned frequency analysis results, the reliability may be further improved by taking account of the use conditions of the carriage drive mechanism. The use conditions include, for example, the total drive time of the carriage drive mechanism and the print count of the printing apparatus.

This vibration analysis is performed in accordance with carriage drive. When a change from the relationship between the resonance frequency band and the cogging occurrence zone shown in FIG. 8A is detected, the preliminary detection operation for cogging cancel control may be performed once to switch calculation control to the control calculation unit 18. In the above-described example, a change of the resonance frequency band along with aging of the carriage 3 has been exemplified. However, for example, it may be controlled to switch between the control calculation units 18 and 22 in accordance with the variation of the resonance frequency band arising from the individual difference of the carriage.

According to the above-described embodiment, it can be controlled to switch between the control calculation units 18 and 22 based on the relationship between the resonance frequency band of the carriage and the cogging occurrence zone of the carriage motor. If the cogging of the carriage motor exists in a band lower than the resonance frequency band, vibration suppression is performed by feedback control using the acceleration sensor. If the cogging exists in a band higher than the resonance frequency band, vibration suppression is performed by cogging cancel control. Therefore, the use of cogging cancel control in which a carriage velocity needs to be detected in advance to obtain frequency information of the cogging becomes restrictive. The number of preliminary detection operations for obtaining a cancel signal is minimized. As a result, the total print throughput is improved.

The vibration suppression effect of acceleration feedback control is not limited to a vibration caused by the cogging torque, but can target all vibrations occurred at the carriage. The vibration suppression effect contributes to even suppression of the velocity variation by feedback control typified by PID control.

Note that the arrangement shown in FIG. 1 employs an arrangement in which ink in the ink tank is supplied to the printhead 2 through the tube 12. In this case, the carriage weight exhibits an almost constant value. To the contrary, in an arrangement in which the ink tank itself is mounted in the carriage, ink is consumed along with the progress of the print operation of the printing apparatus, and the carriage weight decreases. This means that the resonance frequency band shifts to a high frequency band.

In other words, the initial state of the carriage is the state shown in FIG. 8B, and the state changes to one shown in FIG. 8A in accordance with ink consumption. In this case, the control calculation unit 18 first performs vibration suppression. As the carriage weight changes, control calculation is switched to the control calculation unit 22. In this switching determination, the resonance frequency information 23 is obtained based on frequency analysis described with reference to FIGS. 10, 11A, and 11B. To enhance the reliability, the use conditions of the carriage drive mechanism are desirably considered, as described above. In this case, a change of the weight along with ink consumption of the ink tank may be added as preliminary information.

As long as the feedback gain of position/velocity control takes the same setting value, if the drive target (carriage) becomes lighter, the vibration may readily occur at the phase limit of the position/velocity control loop. This vibration trend may be suppressed by the vibration suppression effect of acceleration feedback by the control calculation unit 22, thereby obtaining stable control performance.

As described above, the influence of the cogging can be suppressed more simply than the conventional art by providing an acceleration sensor in an object such as a moving carriage, and performing motor control using detected acceleration information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095508, filed May 2, 2014, which is hereby incorporated by reference herein in its entirety.

What is claimed is:

1. A printing apparatus that performs printing while moving a carriage by a motor, comprising:
an encoder sensor configured to detect at least one of a position and velocity of the carriage;
an acceleration sensor, provided on the carriage, for detecting an acceleration of the moving carriage; and
a control unit configured to drive the motor to move the carriage by feedback control based on outputs of said encoder sensor and said acceleration sensor,
wherein said control unit generates a cancel signal for canceling cogging of the motor while moving the carriage, and determines whether to use the cancel signal for the feedback control to suppress influence of the cogging.

2. The apparatus according to claim 1, wherein said control unit determines whether to use the cancel signal for the feedback control in accordance with analysis of an output of said acceleration sensor.

3. The apparatus according to claim 2, wherein
said control unit determines to use the cancel signal for the feedback control in a case where a band of a cogging frequency of the motor exists in a zone higher than a band of a resonance frequency of the carriage obtained by the analysis, and
determines not to use the cancel signal for the feedback control in a case where the band of the cogging frequency exists in a zone lower than the band of the resonance frequency.

4. The apparatus according to claim 3, wherein information of the resonance frequency is obtained by frequency analysis of the output of said acceleration sensor while moving the carriage.

5. The apparatus according to claim 1, wherein said control unit increases a control gain of the feedback control based on the output of said acceleration sensor in a case where the cancel signal is used, compared to a case where the cancel signal is not used.

6. The apparatus according to claim 1, wherein said control unit determines, in accordance with a moving velocity of the carriage, whether to use the cancel signal.

7. The apparatus according to claim 1, wherein said control unit determines, in accordance with mechanical aging of the carriage, whether to use the cancel signal.

8. The apparatus according to claim 1, wherein a printhead and an ink tank are mounted on the carriage, and said control unit determines, in accordance with consumption of ink of the ink tank, whether to use the cancel signal.

9. A method of controlling a motor used to move a carriage, comprising:
detecting at least one of a position and velocity of the moving carriage by an encoder sensor;
detecting an acceleration of the moving carriage by an acceleration sensor that is different from the encoder sensor and is provided on the carriage; and
controlling drive of the motor to move the carriage by feedback control based on at least an output of the encoder sensor,
wherein the controlling includes generating a cancel signal for canceling cogging of the motor while moving the carriage, and determining whether to use the cancel signal for the feedback control in accordance with analysis of an output of the acceleration sensor.

10. The method according to claim 9, wherein the method is applied to a printing apparatus that performs printing while moving the carriage on which a printhead is mounted.

11. The method according to claim 9, wherein the controlling includes:
determining to use the cancel signal for the feedback control in a case where a band of a cogging frequency of the motor exists in a zone higher than a band of a resonance frequency of the carriage obtained by the analysis; and
determining not to use the cancel signal for the feedback control in a case where the band of the cogging frequency exists in a zone lower than the band of the resonance frequency.

12. A method of controlling a motor used to move an object, comprising:
detecting at least one of a position and velocity of the moving object by an encoder sensor;
detecting an acceleration of the moving object by an acceleration sensor that is different from the encoder sensor and is provided on the object;
driving the motor to move the object by feedback control in accordance with at least an output of the encoder sensor;
analyzing an output of the acceleration sensor to obtain information relating to a resonance frequency of the moving object;
generating a cancel signal for cancelling cogging of the motor; and
determining whether to use the cancel signal for the feedback control in accordance with the obtained information.

13. The method according to claim 12, wherein the determining includes:
determining to use the cancel signal for the feedback control in a case where a band of a cogging frequency of the motor exists in a zone higher than a band of the resonance frequency; and
determining not to use the cancel signal for the feedback control in a case where the band of the cogging frequency exists in a zone lower than the band of the resonance frequency.

* * * * *